(12) United States Patent
Mori et al.

(10) Patent No.: US 11,384,811 B2
(45) Date of Patent: Jul. 12, 2022

(54) SHOCK ABSORBER

(71) Applicant: KYB MOTORCYCLE SUSPENSION CO., LTD., Gifu (JP)

(72) Inventors: Takeshi Mori, Gifu (JP); Hideaki Ogura, Tokyo (JP)

(73) Assignee: KYB MOTORCYCLE SUSPENSION CO., LTD., Gifu (JP)

(*) Notice: Subject to any disclaimer, the term of this patent is extended or adjusted under 35 U.S.C. 154(b) by 0 days.

(21) Appl. No.: 17/048,835

(22) PCT Filed: Jun. 4, 2019

(86) PCT No.: PCT/JP2019/022097
§ 371 (c)(1),
(2) Date: Oct. 19, 2020

(87) PCT Pub. No.: WO2019/239954
PCT Pub. Date: Dec. 19, 2019

(65) Prior Publication Data
US 2021/0148432 A1  May 20, 2021

(30) Foreign Application Priority Data
Jun. 13, 2018 (JP) .............................. JP2018-112435

(51) Int. Cl.
*F16F 9/58* (2006.01)
*F16F 9/516* (2006.01)

(52) U.S. Cl.
CPC ................ *F16F 9/58* (2013.01); *F16F 9/516* (2013.01)

(58) Field of Classification Search
CPC ................ F16F 9/25; F16F 9/516; F16F 9/58

USPC ........................................................ 188/282.6
See application file for complete search history.

(56) References Cited

U.S. PATENT DOCUMENTS

| 4,156,523 A | * | 5/1979 | Bauer | F16F 9/0227 267/120 |
| 5,190,126 A | * | 3/1993 | Curnutt | F16F 9/06 188/269 |
| 5,722,643 A | * | 3/1998 | Chamberlin | F16F 9/02 188/277 |

(Continued)

FOREIGN PATENT DOCUMENTS

| JP | S57-110342 U | 7/1982 |
| JP | 2005-054924 A | 3/2005 |
| JP | 2010-223303 A | 10/2010 |

OTHER PUBLICATIONS

Dec. 7, 2021, Japanese Office Action issued for related JP Application No. 2018-112435.

(Continued)

*Primary Examiner* — Melody M Burch
(74) *Attorney, Agent, or Firm* — Paratus Law Group, PLLC (57) ABSTRACT

A shock absorber includes a bypass passage that is open from the side of a piston rod and causes an extension side chamber and a compression side chamber, which are divided by a piston in a cylinder, to communicate with each other; a shutter that is mounted on an outer circumference of the piston rod to be movable in an axial direction and opens or closes the bypass passage; and a coil spring that connects a rod guide mounted on one end portion of the cylinder and the shutter.

6 Claims, 5 Drawing Sheets

(56) References Cited

U.S. PATENT DOCUMENTS 6,622,831 B2* 9/2003 Roper ................. F16F 9/48
　　　　　　　　　　　　　　　　　　　188/315
2010/0236882 A1　9/2010 Uchiyama

OTHER PUBLICATIONS

May 10, 2022, Japanese Office Action issued for related JP Application No. 2018-112435.

* cited by examiner

SHOCK ABSORBER

CROSS REFERENCE TO PRIOR APPLICATION

This application is a National Stage Patent Application of PCT International Patent Application No. PCT/JP2019/022097 (filed on Jun. 4, 2019) under 35 U.S.C. § 371, which claims priority to Japanese Patent Application No. 2018-112435 (filed on Jun. 13, 2018), which are all hereby incorporated by reference in their entirety.

TECHNICAL FIELD

The present invention relates to an improvement of a shock absorber.

BACKGROUND ART

In the related art, among shock absorbers, there is a shock absorber including a cylinder, a piston rod that is connected to a piston that divides the inside of the cylinder into an extension side chamber and a compression side chamber and projects to the outside of the cylinder, and a damping passage that causes the extension side chamber and the compression side chamber to communicate with each other and gives resistance to the flow of liquid moving therebetween. In such a shock absorber, the liquid flows through the damping passage at the time of extension and contraction of the shock absorber, and a damping force due to the resistance given to the flow of the liquid is generated.

Further, in such a shock absorber, as disclosed in JP2005-54924A, there is a shock absorber in which a bypass passage that bypasses the damping passage to cause the extension side chamber and the compression side chamber to communicate with each other is formed in the piston rod, and the bypass passage is closed by a shutter in a case where the piston is located in a region near the extension side stroke end where the stroke amount of the piston to the extension side becomes a predetermined amount or more.

With the above configuration, in a case where the piston is located in the region near the extension side stroke end, the flow rate of the liquid flowing through the damping passage is increased by the amount that the bypass passage is closed, so that the damping force generated can be increased. Therefore, as the shock absorber extends, a large damping force is generated near the extension side stroke end, and the extension speed of the shock absorber can be reduced by the large damping force and then stopped. Therefore, the shock at the time of maximum extension of the shock absorber can be alleviated.

SUMMARY OF INVENTION

Figure 5:
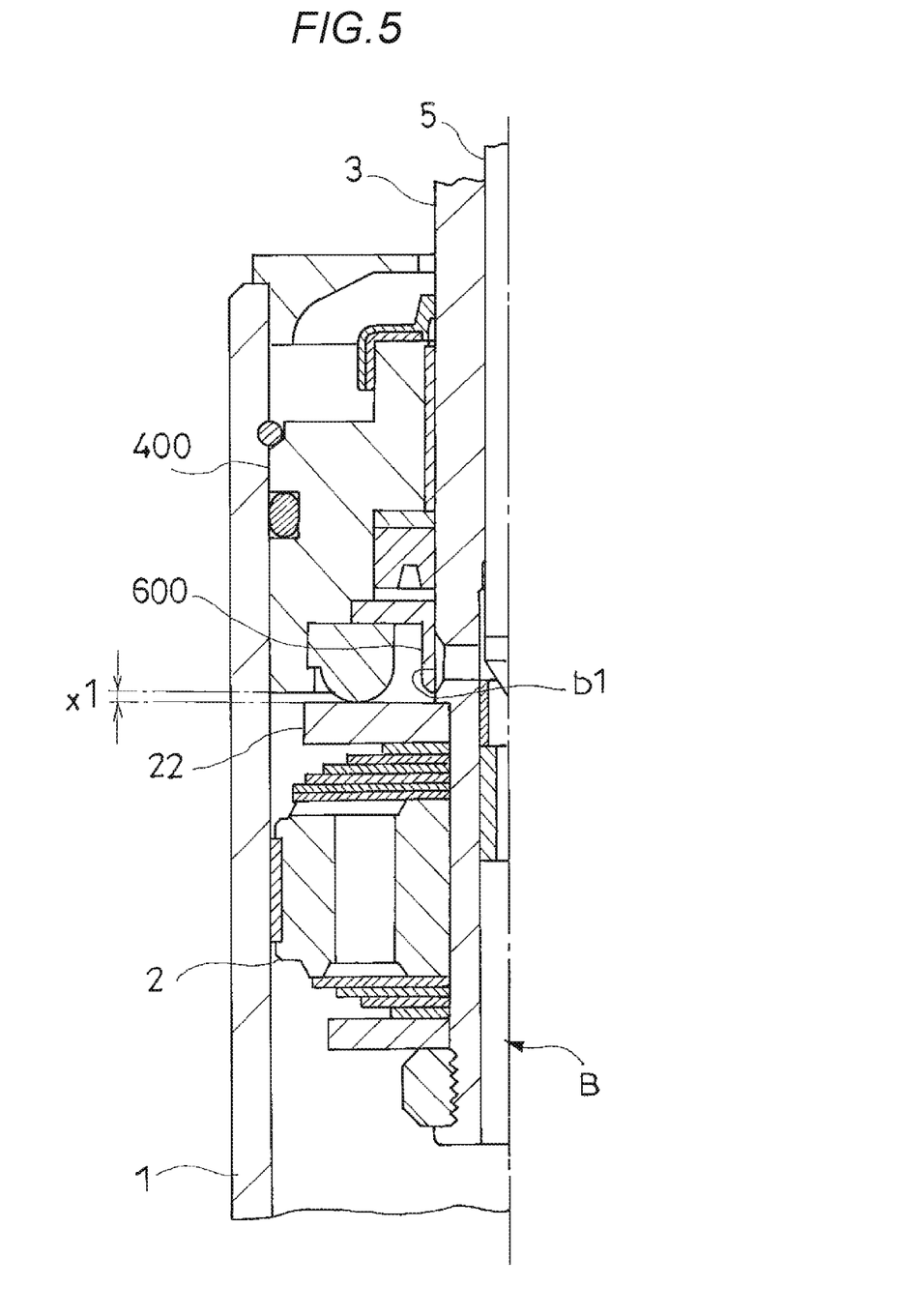
FIG. 5 is a partially enlarged vertical sectional view illustrating a state where a piston of a shock absorber in the related art is located at a start end of a closed area.

Here, for example, in the shock absorber disclosed in JP2005-54924A, as illustrated in FIG. 5, a shutter 600 is attached to a rod guide 400 that is mounted on one end portion of a cylinder 1 in an axial direction and slidably supports a piston rod 3. The shutter 600 has an annular shape, and an inner circumference of the shutter 600 is in sliding contact with an outer circumference of the piston rod 3.

Further, a bypass passage B is open on the side of the piston rod 3, and when the piston rod 3 protrudes from the cylinder 1 at the time of extension of the shock absorber and the piston 2 is moved upward in the figure, an opening b1 of the bypass passage B is blocked by the shutter 600 (FIG. 5). Then, when the shock absorber further extends, a stopper 22 provided on the outer circumference of the piston rod 3 hits the rod guide 400, and the piston 2 is inhibited from being further moved upward in the figure, so that further extension of the shock absorber is inhibited.

In this way, the position of the piston 2 when the stopper 22 and the rod guide 400 are in contact with each other is the extension side stroke end, and at that time, the shock absorber is in a most extended state (extension). Even in a state where the piston 2 is moved up to the extension side stroke end, the opening b1 is kept blocked by the shutter 600.

As described above, a stroke area of the piston in which the bypass passage B is blocked by the shutter 600 is set as a closed area. Then, as illustrated in FIG. 5, the size of the closed area of the shock absorber in the related art is equal to a distance xl between the stopper 22 and the rod guide 400 when the piston 2 is located at a start end of the closed area where a lower end of the opening b1 of the bypass passage B and a lower end of the shutter 600 overlap in a radial direction.

Then, in order to enlarge the closed area, a method of increasing the axial length of the shutter 600 and closing the bypass passage B from an early stage (position lower than the position of the piston 2 illustrated in FIG. 5) in the extension stroke of the shock absorber is considered, but this method alone cannot enlarge the closed area.

This is because the stopper 22 hits the shutter 600 before hitting the rod guide 400 only by increasing the axial length of the shutter 600, and the piston 2 is inhibited from being further moved upward, so that the closed area is not enlarged.

For this reason, in the shock absorber in the related art, it is difficult to enlarge the closed area where the shutter closes the passage that is formed in the piston rod to cause the extension side chamber and the compression side chamber to communicate with each other, such as the bypass passage B, so that the closed area is limited to an area close to the extension side stroke end.

Then, this invention solves such a problem, and an object of the invention is to provide a shock absorber which can easily enlarge a closed area where a passage that is formed in a piston rod to cause an extension side chamber and a compression side chamber to communicate with each other is closed.

A shock absorber that solves the above-mentioned problem includes a passage that is open from a side of a piston rod and causes an extension side chamber and a compression side chamber, which are divided by a piston in a cylinder, to communicate with each other; a shutter that is mounted on an outer circumference of the piston rod to be movable in an axial direction and opens or closes the passage; and an elastic member that connects a rod guide mounted on one end portion of the cylinder and the shutter.

DESCRIPTION OF EMBODIMENTS

Hereinafter, a shock absorber according to an embodiment of the invention will be described with reference to the drawings. The same reference numerals denoted throughout several drawings refer to the same components or corresponding components.

Figure 1:
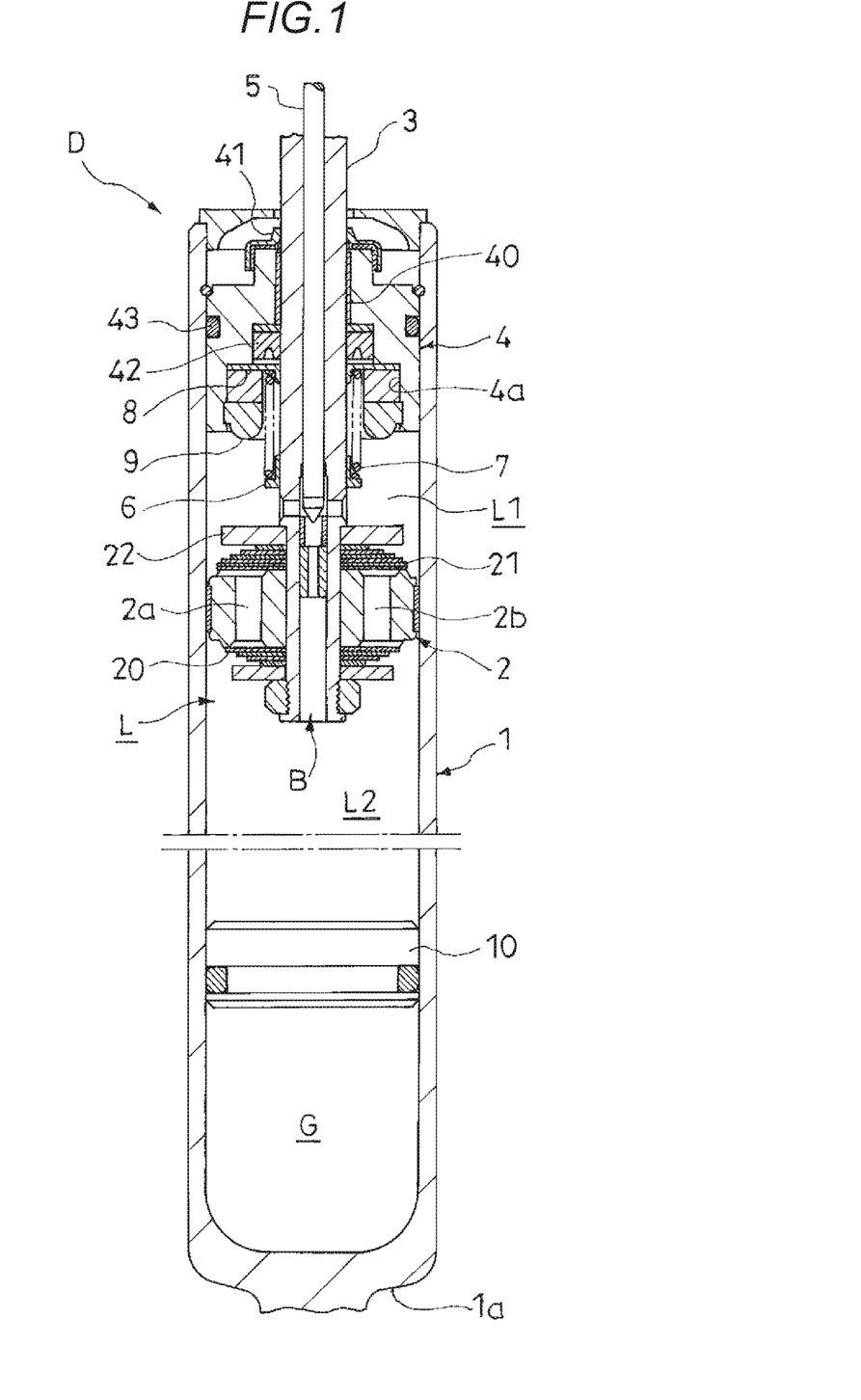
FIG. 1 is a vertical sectional view illustrating a shock absorber according to an embodiment of the invention.

A shock absorber D according to the embodiment illustrated in FIG. 1 is used for a rear cushion unit for suspending rear wheels of a saddle-ride type vehicle, a suspension device of an automobile including a vehicle interior, or the like.

In the following description, for convenience of description, the upper and lower sides of the shock absorber D in the state illustrated in FIG. 1 are simply referred to as "upper" and "lower". However, it goes without saying that the upper and lower sides of the shock absorber D in the state of being attached to a vehicle can be appropriately changed according to an attachment target. Specifically, the shock absorber D may be attached to the vehicle in the same orientation as in FIG. 1 or may be attached upside down.

Subsequently, a specific structure of the shock absorber D according to the present embodiment will be described. As illustrated in FIG. 1, the shock absorber D includes a cylinder 1 having a bottomed tubular shape, a piston 2 slidably inserted into the cylinder 1, a piston rod 3 of which the lower end is connected to the piston 2 and the upper end projects to the outside of the cylinder 1.

A bracket (not illustrated) is provided on the upper end of the piston rod 3, and the piston rod 3 is connected to one of the vehicle body and the axle via the bracket. On the other hand, a bracket (not illustrated) is also provided on a bottom portion 1a of the cylinder 1, and the cylinder 1 is connected to the other of the vehicle body and the axle via the bracket.

In this way, the shock absorber D is interposed between the vehicle body and the axle. When the wheels vibrate up and down with respect to the vehicle body, such as when the vehicle travels on an uneven road surface, the piston rod 3 is moved in and out of the cylinder 1, the shock absorber D extends and contracts, and the piston 2 is moved up and down (axial direction) in the cylinder 1.

Further, the shock absorber D includes an annular rod guide 4 which is attached to an upper end portion of the cylinder 1 and slidably supports the piston rod 3. An annular bush 40 is mounted on the inner circumference of the rod guide 4, and the rod guide 4 slidably supports the piston rod 3 via the bush 40. The bush 40 may be eliminated and the rod guide 4 may directly support the piston rod 3.

Further, a dust seal 41 and an oil seal 42 that are in sliding contact with the outer circumference of the piston rod 3, and an outer circumferential seal 43 that is in close contact with the inner circumference of the cylinder 1 are mounted on the rod guide 4. By these seals and the rod guide 4, the upper end of the cylinder 1 is blocked in a liquid-tight manner while the insertion of the piston rod 3 into the cylinder 1 is allowed.

The dust seal 41, the oil seal 42, and the outer circumferential seal 43 illustrated in FIG. 1 are individually mounted on the rod guide 4. However, the dust seal 41, the oil seal 42, and the outer circumferential seal 43 may be integrated as one seal member. As described above, the configuration of the seal member that seals the outer circumference of the piston rod 3 and the inner circumference of the cylinder 1 can be appropriately changed.

As described above, the upper end of the cylinder 1 is blocked by the rod guide 4. On the other hand, the lower end of the cylinder 1 is blocked by the bottom portion 1a. In this way, the inside of the cylinder 1 is a closed space. A free piston 10 is slidably inserted into the cylinder 1 to be on a side opposite to the piston rod 3 when viewed from the piston 2.

A liquid chamber L is formed above the free piston 10 in the cylinder 1, and a gas chamber G is formed below the free piston 10 in the cylinder 1. Further, the liquid chamber L is divided by the piston 2 into an extension side chamber L1 on the piston rod 3 side and a compression side chamber L2 on the piston 2 side, and each of the extension side chamber L1 and the compression side chamber L2 is filled with a liquid such as hydraulic oil. On the other hand, the gas chamber G is filled with air or a gas such as nitrogen gas in a compressed state.

Instead of the free piston 10, a bladder, a bellows, or the like may be used to separate the liquid chamber L from the gas chamber G, and the configuration of the movable division wall serving as the partition can be appropriately changed. Further, the member which has the movable division wall therein and in which the gas chamber G is formed is not limited to the cylinder 1, and the movable division wall may be provided in a tank to form the gas chamber G by providing, for example, the tank separately installed from the cylinder 1.

In the piston 2, an extension side passage 2a and a compression side passage 2b which cause the extension side chamber L1 and the compression side chamber L2 to communicate with each other are formed. Further, an extension side valve 20 that opens or closes the outlet of the extension side passage 2a is laminated on the lower side of the piston 2 (compression side chamber L2 side), and a compression side valve 21 that opens or closes the outlet of the compression side passage 2b is laminated on the upper side of the piston 2 (extension side chamber L1 side).

The extension side valve 20 is an extension side damping element, and is opened at the time of extension of the shock absorber D to give resistance to the flow of liquid from the extension side chamber L1 toward the compression side chamber L2. On the other hand, the compression side valve 21 is a compression side damping element, and is opened at the time of contraction of the shock absorber D to give resistance to the flow of liquid from the compression side chamber L2 toward the extension side chamber L1.

With the above configuration, in a case where the piston rod 3 protrudes from the cylinder 1 and the shock absorber D extends, the piston 2 is moved upward in the cylinder 1 to compress the extension side chamber L1. Then, the liquid in the extension side chamber L1 pushes and opens the extension side valve 20, and is moved to the compression side chamber L2 through the extension side passage 2a. The resistance is given to the flow of the liquid by the extension side valve 20. Therefore, at the time of extension of the shock absorber D, the pressure in the extension side chamber L1 rises, and an extension side damping force that hinders the extension operation of the shock absorber D is generated.

Further, at the time of extension of the shock absorber D, the volume of the piston rod 3 that has protruded from the cylinder 1 and the volume in the cylinder 1 are increased. Then, the free piston 10 is pushed up by the pressure of the gas chamber G. In this way, at the time of extension of the shock absorber D, the volume of the gas chamber G is increased, so that the volume of the piston rod 3 that has protruded from the cylinder 1 can be compensated.

On the contrary, in a case where the piston rod 3 enters the cylinder 1 and the shock absorber D contracts, the piston 2 is moved downward in the cylinder 1 to compress the compression side chamber L2.

Then, the liquid in the compression side chamber L2 pushes and opens the compression side valve 21, and is moved to the extension side chamber L1 through the compression side passage 2b. The resistance is given to the flow of the liquid by the compression side valve 21. Therefore, at the time of contraction of the shock absorber D, the pressure in the compression side chamber L2 rises, and a compression side damping force that hinders the contraction operation of the shock absorber D is generated.

Further, at the time of contraction of the shock absorber D, the volume of the piston rod 3 that has entered the cylinder 1 and the volume in the cylinder 1 are reduced. Then, the free piston 10 is pushed down against the pressure of the gas chamber G. In this way, at the time of contraction of the shock absorber D, the volume of the gas chamber G is reduced, so that the volume of the piston rod 3 that has entered the cylinder 1 can be compensated.

As can be seen from the above, in the present embodiment, each of the extension side valve 20 and the compression side valve 21 functions as a damping element for generating an extension side or compression side damping force. Further, each of the extension side passage 2a and the compression side passage 2b is a damping passage provided with an extension side or compression side damping element. Further, in the present embodiment, each of the extension side valve 20 and the compression side valve 21 as the damping element is a leaf valve, and each of the extension side passage 2a and the compression side passage 2b as the damping passage is a one-way passage. Therefore, the extension side damping force and the compression side damping force can be set independently.

However, the configuration of the damping element can be appropriately changed. For example, as the damping element, a valve such as a poppet valve other than a leaf valve may be used or an orifice or a throttle such as a choke may be used. Further, the damping passage may not necessarily be a one-way passage, and bidirectional flow may be allowed. In addition, the damping passage may not necessarily be formed in the piston 2, and may be formed, for example, on the outer circumferential side of the cylinder 1.

Furthermore, the form of the shock absorber D can be appropriately changed. For example, in the present embodiment, the shock absorber D is a single rod, single cylinder type. However, an outer shell may be provided on the outer circumference of the cylinder 1 to form a double-tube type shock absorber. In this case, the gas chamber G and the free piston 10 are eliminated, a liquid is stored between the cylinder 1 and the outer shell to form a reservoir chamber, and the volume of the piston rod which is moved in and out of the cylinder can be compensated by the reservoir chamber. Further, the shock absorber may be a double rod type by causing the piston rod 3 to project from both sides of the piston 2 to the outside of the cylinder 1, and in this case, the compensation itself of the volume of the piston rod that is moved in and out of the cylinder can be eliminated.

The shock absorber D includes a bypass passage B that bypasses the extension side passage 2a and the compression side passage 2b as the damping passages to cause the extension side chamber L1 and the compression side chamber L2 to communicate with each other. The bypass passage B is formed in the piston rod 3, one end of which is open to the side of the piston rod 3 and is connected to the extension side chamber L, and the other end of which is open below the piston rod 3 and is connected to the compression side chamber L2.

Figure 2:
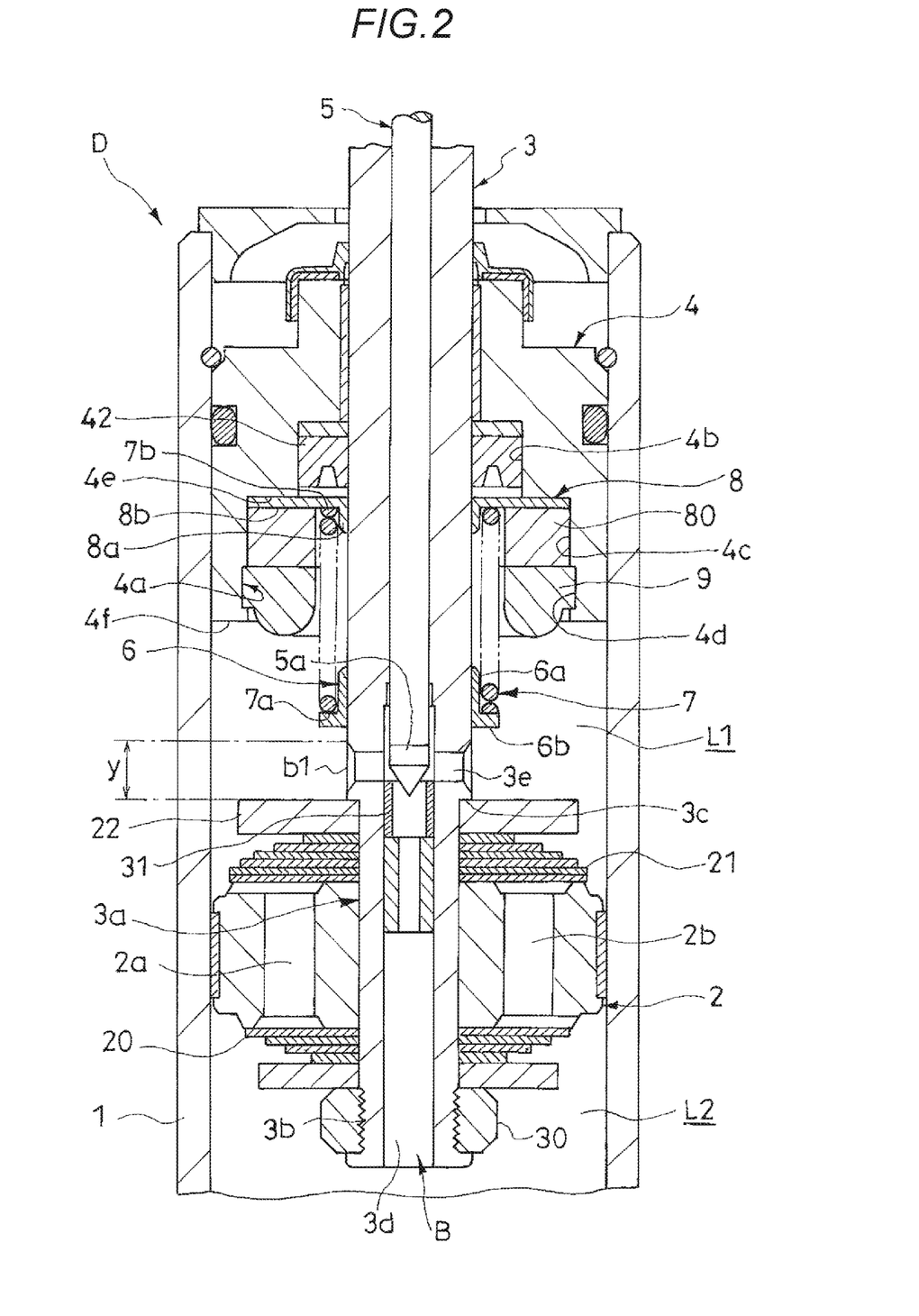
FIG. 2 is a partially enlarged vertical sectional view illustrating a part of FIG. 1 in an enlarged manner.

More specifically, as illustrated in FIG. 2, an attachment portion 3a having an outer diameter smaller than that of a portion immediately above the attachment portion 3a is provided on a tip end portion of the piston rod 3. A screw groove 3b is formed on the outer circumference of the tip end of the attachment portion 3a so that a nut 30 is screwed therewith, and an annular step 3c is formed at the terminal end of the attachment portion 3a. Then, when the annular compression side valve 21, the annular piston 2, and the annular extension side valve 20 are mounted on the outer circumference of the attachment portion 3a and the nut 30 is tightened, the inner circumferential portions of the compression side valve 21, the piston 2, and the extension side valve 20 are interposed between the nut 30 and the step 3c, and fixed to the outer circumference of the piston rod 3.

Further, the piston rod 3 is formed with a longitudinal hole 3d that penetrates the center of the piston rod 3 in the axial direction, and a lateral hole 3e that is open from the side of a portion immediately above the step 3c and passes through the longitudinal hole 3d. Assuming that, in the longitudinal hole 3d, a side above the connection portion with the lateral hole 3e is an upper portion of the longitudinal hole 3d and a side below the connection portion (including the connection portion) is a lower portion of the longitudinal hole 3d, a control rod 5 is inserted into the upper portion of the longitudinal hole 3d so as to be slidable in the axial direction.

The outer circumference of the control rod 5 is blocked by a seal (not illustrated) so that a liquid does not leak from a portion between the control rod 5 and the piston rod 3. Thus, the upper portion of the longitudinal hole 3d is blocked. On the other hand, the lower portion of the longitudinal hole 3d communicates with the lateral hole 3e and the compression side chamber L2, and the lateral hole 3e communicates with the extension side chamber L1.

Therefore, the liquids in the extension side chamber L1 and the compression side chamber L2 bypass the extension side passage 2a and the compression side passage 2b as the damping passages, and can be moved back and forth through the lateral hole 3e and the lower portion of the longitudinal hole 3d. As described above, in the present embodiment, a passage that has the lateral hole 3e and the lower portion of the longitudinal hole 3d and that causes the extension side chamber L1 and the compression side chamber L2 to communicate with each other is configured, and this passage is the bypass passage B that bypasses the damping passage.

Further, a tubular valve seat member 31 is fitted to the lower portion of the longitudinal hole 3d which is a part of the bypass passage B. A needle 5a is provided at the lower end of the control rod 5 in a state where the tip end of the needle 5a is inserted into the inner circumferential side of the valve seat member 31, and the flow of the liquid passing through the bypass passage B is restricted by the needle 5a.

Further, although not illustrated, an adjuster is attached to the bracket provided on the upper end portion of the piston rod 3. Then, when this adjuster is operated, the control rod 5 is moved in the axial direction in the piston rod 3 together with the needle 5a, and the flow passage area (throttle degree) of the bypass passage B is changed.

Therefore, the flow rate of the liquid passing through the damping passage is changed by the operation of the adjuster, and the damping force generated by the shock absorber D can be adjusted in magnitude.

Specifically, when the adjuster is operated to move the needle 5a forward toward the valve seat member 31, the flow passage area of the bypass passage B becomes narrower. Then, since at the time of expansion and contraction of the shock absorber D, the flow rate of the liquid passing through the bypass passage B is decreased and the flow rate of the liquid passing through the damping passage (extension side passage 2a or compression side passage 2b) is increased, the damping force generated by the shock absorber D is increased.

On the contrary, when the adjuster is operated to retract the needle 5a in a direction away from the valve seat member 31, the flow passage area of the bypass passage B becomes wider. Then, since at the time of expansion and contraction of the shock absorber D, the flow rate of the liquid passing through the bypass passage B is increased and the flow rate of the liquid passing through the damping passage (extension side passage 2a or compression side passage 2b) is decreased, the damping force generated by the shock absorber D is decreased.

As described above, in the present embodiment, the needle 5a serves as a valve body of a variable throttle valve, and the flow passage area of the bypass passage B is increased or decreased by this variable throttle valve, and thereby the damping force generated by the shock absorber D can be adjusted in magnitude. However, the flow passage area of the bypass passage B may not necessarily be variable. For example, the upper portion of the longitudinal hole 3d, the adjuster, the control rod 5, the needle 5a, and the valve seat member 31 may be eliminated, and a fixed orifice may be formed in the middle of the bypass passage B.

An annular shutter 6 that opens or closes the bypass passage B is slidably mounted on the outer circumference of the piston rod 3. The shutter 6 is connected to the rod guide 4 via a coil spring 7. More specifically, the coil spring 7 is mounted on the outer circumference of the piston rod 3. The shutter 6 is fitted to the lower end of the coil spring 7, and is connected to the rod guide 4 via the coil spring 7 and a connection member 8 fitted to the upper end of the coil spring 7.

The connection member 8 has an annular fitting portion 8a fitted to the inner circumference of the upper end portion of the coil spring 7, and an annular seat portion 8b that projects outward in the radial direction from the upper end of the fitting portion 8a and supports the upper end of the coil spring 7, and the connection member 8 is housed in a recess portion 4a of the rod guide 4 with the seat portion 8b facing upward. In addition to the connection member 8, the oil seal 42, a spacer 80, and a cushion rubber 9 are housed in the recess portion 4a.

Specifically, the recess portion 4a is open downward (to the extension side chamber L1 side), and the upper side (bottom side) of the recess portion 4a has a smaller inner diameter than the lower side (opening side). Assuming that, in the recess portion 4a, a portion having a small inner diameter is a small diameter recess 4b and a portion having a large inner diameter is a large diameter recess 4c, the oil seal 42 is housed in the small diameter recess 4b. Meanwhile, the connection member 8, the spacer 80, and the cushion rubber 9 are housed in the large diameter recess 4c in this order from the small diameter recess 4b side.

Further, an annular groove 4d is formed along the circumferential direction on the inner circumference of the opening-side end portion of the large diameter recess 4c, and the outer circumferential portion of the cushion rubber 9 is fitted to the annular groove 4d. The cushion rubber 9 is a member having elasticity such as rubber or elastomer, and the lower end of the cushion rubber 9 projects downward from the recess portion 4a in an initial attachment state (FIG. 2).

Here, the initial attachment state means a state in which a member to be attached such as the cushion rubber 9 is attached to an attachment target such as the rod guide 4 and no external force is applied to the member to be attached. For example, the force that the cushion rubber 9 receives from the rod guide 4 as the reaction force of its own elastic force when the cushion rubber 9 is attached to the rod guide 4 is not included in the external force.

The upper end of the cushion rubber 9 is in contact with the lower end of the spacer 80. Further, the spacer 80 is in contact with the lower end of the outer circumferential portion of the seat portion 8b of the connection member 8, and the upper end of the seat portion 8b is in contact with an annular step 4e that is formed at the boundary between the small diameter recess 4b and the large diameter recess 4c. That is, in the present embodiment, the connection member 8 and the spacer 80 are held by the rod guide 4 by being interposed between the cushion rubber 9 and the step 4e, and the coil spring 7 is connected to the rod guide 4 via the connection member 8.

The configuration for connecting the coil spring 7 to the rod guide 4 is not limited to that illustrated in the drawings, and can be appropriately changed. For example, the spacer 80 may be eliminated so that the connection member 8 is directly pressed by the cushion rubber 9, or the connection member 8 may be eliminated so that the coil spring 7 is directly fitted to the rod guide 4.

The shutter 6 fitted to the lower end of the coil spring 7 has a tubular shutter main body 6a that is fitted to the inner circumference of the lower end of the coil spring 7 and is in sliding contact with the outer circumference of the piston rod 3, and an annular seat portion 6b that projects outward in the radial direction from the lower end of the shutter main body 6a and supports the lower end of the coil spring 7. Then, in the state where the coil spring 7 in the attachment state has a natural length (initial attachment state), the lower end of the shutter 6 projects downward from the recess portion 4a and is located below the lower end of the cushion rubber 9 (FIG. 2).

Further, the annular stopper 22 is mounted, together with the piston 2, on the outer circumference of the piston rod 3 so as to face the lower end of the shutter 6 and a lower end 4f of the rod guide 4. When the piston 2 illustrated in FIG. 2 is moved upward with the extension operation of the shock absorber D, the stopper 22 hits the lower end of the shutter 6 and the lower end of the cushion rubber 9 in this order. Further, when the stopper 22 is moved upward while compressing the coil spring 7 and the cushion rubber 9 and comes into contact with the lower end 4f of the rod guide 4, the stopper 22 is inhibited from being further moved upward.

As described above, when the stopper 22 and the rod guide 4 come into contact with each other, the piston 2 is inhibited from being further moved upward. That is, the position of the piston when the stopper 22 and the rod guide 4 are in contact with each other is the extension side stroke end of the piston 2. Then, when the piston 2 reaches the extension side stroke end, further extension of the shock absorber D is prevented, and the shock absorber D is in the most extended state (extension).

As described above, the shutter 6 has an annular shape, and the axial length of the shutter 6 is longer than the length (distance y in FIG. 2) from the upper end of the stopper 22 to the upper end of the opening b1 on the extension side chamber L1 side in the bypass passage B. Therefore, in the extension stroke of the shock absorber D, when the lower end of the opening b1 reaches the lower end of the shutter 6 (FIG. 3), the opening b1 is blocked by the shutter 6, and the opening b1 is kept in the closed state by the shutter 6 until the stopper 22 comes into contact with the shutter 6 and is moved upward while pushing up the shutter 6 to hit the rod guide 4 (FIG. 4).

In a case where the end of the coil spring 7 on the shutter 6 side is a free end 7a (FIG. 2) and the end of the coil spring 7 on the rod guide 4 side is a fixed end 7b, the distance from the fixed end 7b in a state where the wires constituting the coil spring 7 are in close contact with each other so that the coil spring 7 has a close-contact length to the lower end (end on the stopper 22 side) of the shutter 6 is shorter than a distance z (FIG. 4) from the fixed end 7b to the opening end of the recess portion 4a. Furthermore, the total length of the axial length of the fitting portion 8a and the axial length of the shutter 6 is shorter than the distance z.

Figure 4:
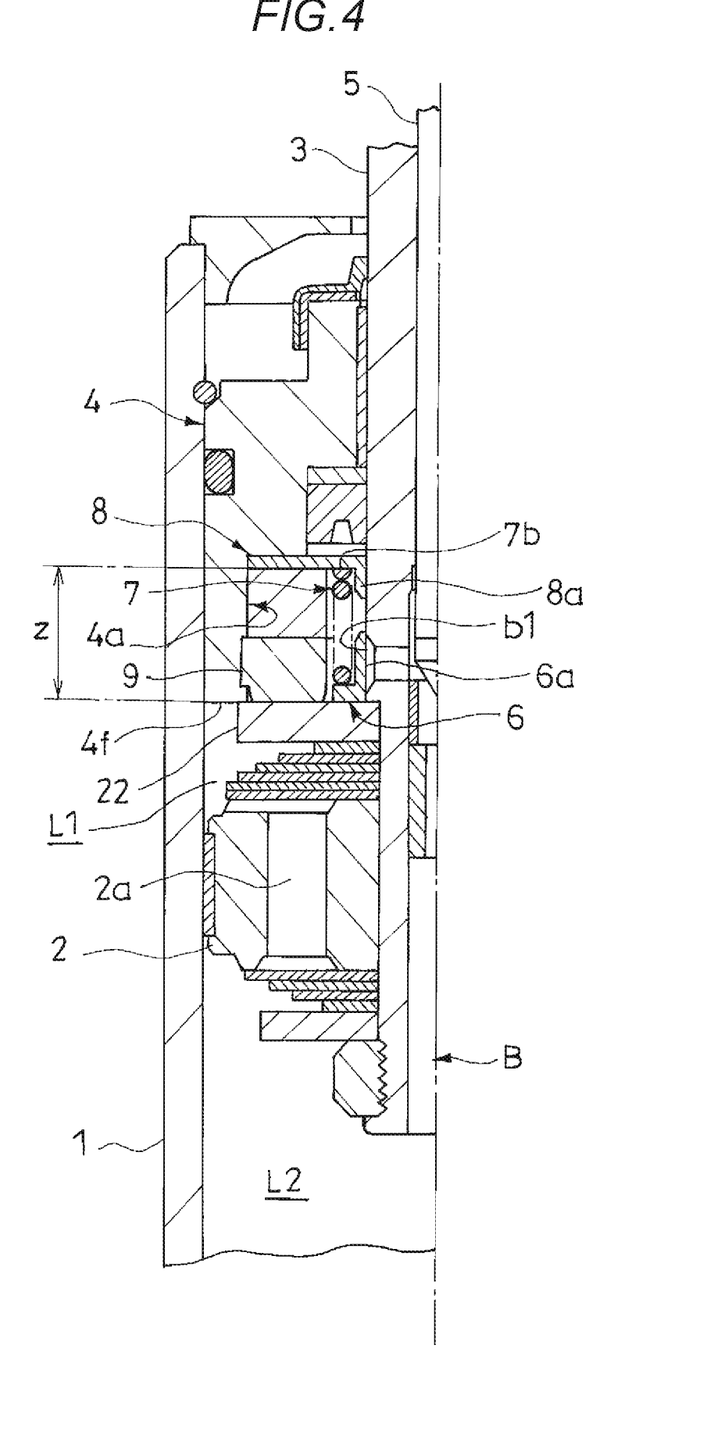
FIG. 4 is a partially enlarged vertical sectional view illustrating a state in which the piston of the shock absorber according to the embodiment of the invention is at an extension side stroke end that is a terminal end of the closed area.

Therefore, as illustrated in FIG. 4, when the stopper 22 and the rod guide 4 are in contact with each other, since the length of the coil spring 7 is longer than the close-contact length (close-contact height) and a gap is formed between the shutter main body 6a and the fitting portion 8a of the connection member 8, the durability of the coil spring 7 and the shutter 6 can be improved.

Hereinafter, the operation of the shock absorber D according to the present embodiment will be described.

Figure 3:
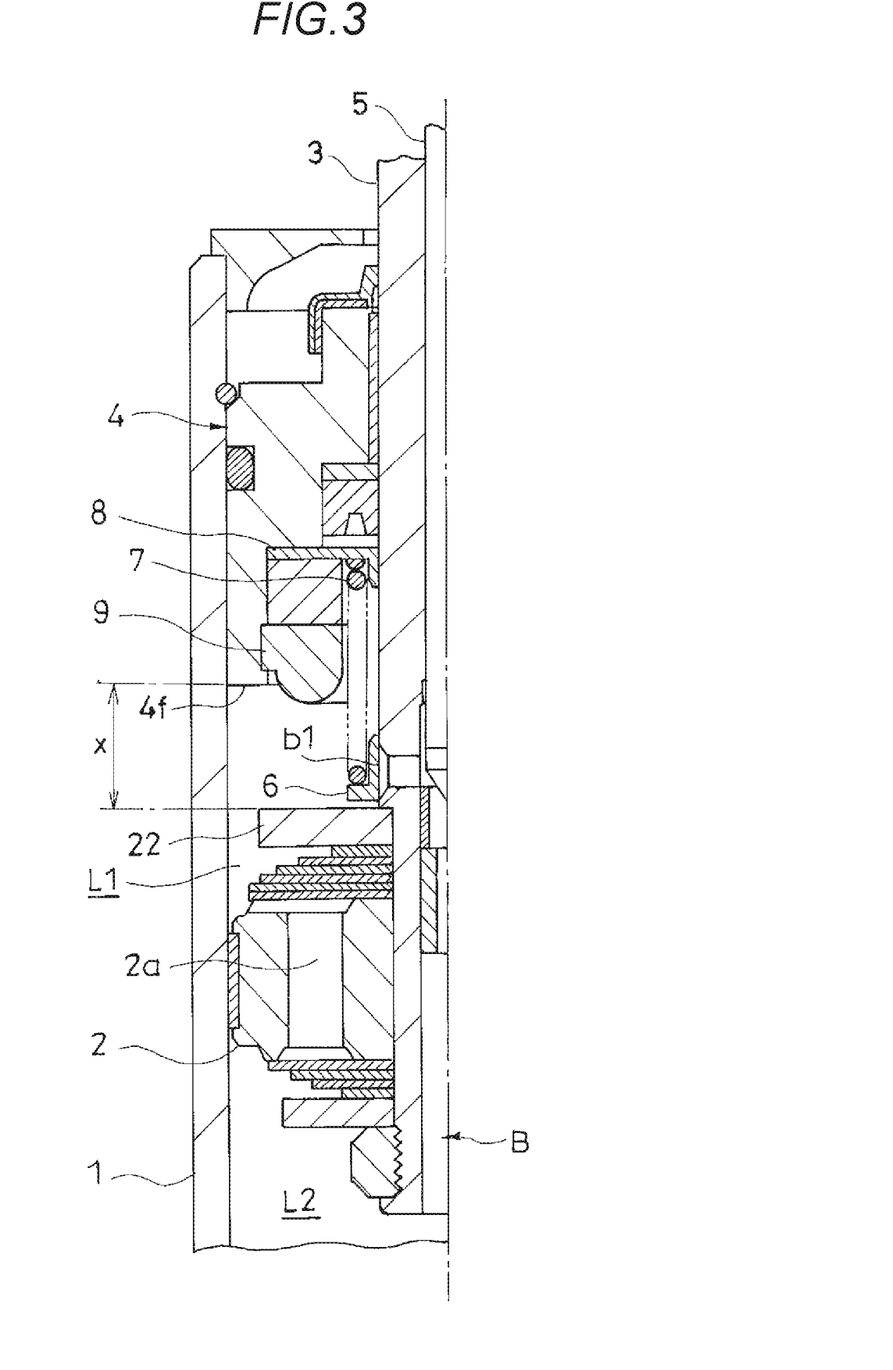
FIG. 3 is a partially enlarged vertical sectional view illustrating a state in which a piston of the shock absorber according to the embodiment of the invention is located at a start end of a closed area.

When the shock absorber D extends and the stroke amount of the piston 2 to the upper side (extension side) becomes a predetermined amount or more, the lower end of the opening b1 reaches the lower end of the shutter 6 and the shutter 6 closes the bypass passage B (FIG. 3). Then, when the shock absorber D further extends from such a state and the piston 2 advances upward, the shutter 6 is pushed up by the stopper 22 while closing the bypass passage B until the stopper 22 comes into contact with the lower end of the shutter 6 and the piston 2 reaches the extension side stroke end (FIG. 4).

In this way, a predetermined stroke area on the extension side stroke end side where the stroke amount of the piston 2 to the extension side becomes the predetermined amount or more is the closed area where the bypass passage B is closed by the shutter 6. Then, the size of the closed area is equal to a distance x (FIG. 3) between the stopper 22 and the rod guide 4 when the piston 2 is located at a start end of the closed area where the lower end of the opening b1 and the lower end of the shutter 6 overlap in the radial direction.

Further, in a case where the piston 2 is in the closed area, the liquid cannot pass through the bypass passage B, so that the flow rate of the liquid passing through the damping passage (extension side passage 2a or compression side passage 2b) is increased. Therefore, in a case where the piston 2 is in the closed area, the damping force generated by the shock absorber D is increased as compared with a case where the piston 2 is in an area other than the closed area. Then, since the stopper 22 hits the rod guide 4 after the extension speed of the shock absorber D is reduced by the large damping force, the shock at the time of the maximum extension of the shock absorber D can be alleviated.

Further, in a case where the piston 2 is in the closed area, in an area where the stopper 22 approaches the rod guide 4 while pushing up the shutter 6, the coil spring 7 is compressed. In this way, when the coil spring 7 is compressed, an elastic force is exerted to urge the shock absorber D in a direction to separate the stopper 22 and the rod guide 4, that is, in a contraction direction, and the urging force is increased as the stopper 22 approaches the rod guide 4.

Further, in a case where the piston 2 is in the closed area, when the stopper 22 approaches the rod guide 4, the cushion rubber 9 is compressed together with the coil spring 7. When the cushion rubber 9 is compressed, an elastic force is exerted to urge the shock absorber in a direction (contraction direction) to separate the stopper 22 and the rod guide 4, and the urging force is increased as the stopper 22 approaches the rod guide 4.

As described above, in the present embodiment, as the piston 2 in the closed area approaches the extension side stroke end, the two elastic members of the coil spring 7 and the cushion rubber 9 sequentially start to function. Further, since the extension operation of the shock absorber D is also hindered by the urging force of these elastic members, the shock at the time of the maximum extension of the shock absorber D can be alleviated.

Hereinafter, the function and effect of the shock absorber D according to the present embodiment will be described.

The shock absorber D of the present embodiment includes the cylinder 1, the piston 2 that is slidably inserted into the cylinder 1 and divides the inside of the cylinder 1 into the extension side chamber L1 and the compression side chamber L2, the piston rod 3 that is inserted into the cylinder 1 to be movable in the axial direction and is connected to the piston 2, and the annular rod guide 4 that is mounted on the upper end portion (one end portion) of the cylinder 1 in the axial direction and slidably supports the piston rod 3.

Further, the shock absorber D of the present embodiment includes the bypass passage (passage) B that is open from the side of the piston rod 3 to cause the extension side chamber L1 and the compression side chamber L2 to communicate with each other, the shutter 6 that is mounted on the outer circumference of the piston rod 3 to be movable in the axial direction and opens or closes the bypass passage (passage) B, and the coil spring (elastic member) 7 that connects the shutter 6 and the rod guide 4.

As described above, in the present embodiment, the position of the shutter 6 with respect to the rod guide 4 can be lowered by an amount corresponding to the connection of the shutter 6 and the rod guide 4 by the coil spring (elastic member) 7. Further, since the coil spring 7 can be elastically deformed, it is possible to prevent the movement of the piston 2 to the extension side from being inhibited by the shutter 6. Therefore, with the above configuration, it is possible to easily enlarge the closed area (distance x in FIG. 3) where the bypass passage B is closed by the shutter 6 as compared with the closed area in the related art (distance x1 in FIG. 5).

Furthermore, when the coil spring (elastic member) 7 is compressed in the closed area, an elastic force is exerted to urge the shock absorber D in the contraction direction, and the urging force is increased as the shock absorber D extends. In this way, in the closed area, since the extension operation of the shock absorber D is also hindered by the urging force of the coil spring (elastic member) 7, the shock at the time of the maximum extension of the shock absorber D can be alleviated even when the pressure of the extension side chamber L1 in the closed area is lower than that in the related art.

Further, the shock absorber D of the present embodiment includes the needle (valve body) 5a that is inserted into the bypass passage (passage) B and is able to change the flow passage area of the bypass passage, and the adjuster (not illustrated) that drives the needle 5a via the control rod 5 inserted into the piston rod 3. With this configuration, the damping force generated by the shock absorber D can be adjusted in magnitude by changing the flow rate of the liquid passing through the bypass passage B by operating the adjuster.

The mechanism for adjusting the damping force as described above is also used in a shock absorber that does not include the shutter 6 that opens or closes the bypass passage B. Therefore, in order to make the components common between the shock absorber including such a shutter and the shock absorber having no shutter, and to enlarge the closed area while reducing the cost, it is preferable to connect the shutter 6 and the rod guide 4 using the coil spring (elastic member) 7 as in the shock absorber D of the present embodiment.

This is because, for example, in the shock absorber in the related art illustrated in FIG. 5, the size of the closed area can be increased by increasing the axial length of the shutter 600 and shifting the opening b1 of the bypass passage B upward. However, in doing so, it is required to not only change the piston rod 3 but also change the control rod 5.

On the other hand, as in the shock absorber D of the present embodiment, if the shutter 6 and the rod guide 4 are connected by the coil spring (elastic member) 7, the closed area can be enlarged without changing the position of the opening b1, and therefore it is not necessary to change the piston rod 3 and the control rod 5.

The configuration of the mechanism for adjusting the damping force can be appropriately changed. For example, in the present embodiment, the control rod 5 is used to drive the needle 5a, but the needle 5a may be driven hydraulically. Further, the valve body driven by the control rod 5 may be other than the needle 5a. For example, a tubular valve body formed with a plurality of throttle holes having different sizes may be provided, and this valve body may be rotationally driven by the control rod to switch the throttle holes facing the lateral hole. Furthermore, the mechanism for adjusting the damping force may be omitted.

Further, in the present embodiment, the coil spring 7 is used to connect the shutter 6 and the rod guide 4, but a member other than the coil spring may be used as the member connecting the shutter 6 and the rod guide 4 as long as the member is a member having elasticity (elastic member). For example, as the elastic member, rubber, an elastomer, or a spring member other than the coil spring such as a disc spring or a leaf spring can be used.

Further, in the present embodiment, the stopper 22 that can come into contact with the lower end (tip end) 4f of the rod guide 4 and the lower end (tip end) of the shutter 6 is provided on the outer circumference of the piston rod 3. Further, the recess portion 4a which is open from the lower end (tip end) 4f of the rod guide 4 and can house the shutter 6 and the coil spring 7 is formed in the rod guide 4. The distance z (FIG. 4) from the fixed end (one end on the rod guide 4 side) 7b of the coil spring 7 to the opening end of the recess portion 4a is shorter than the distance from the fixed end 7b in a state where the coil spring 7 has a natural length to the lower end of the shutter 6.

With the above configuration, in the initial attachment state, the shutter 6 projects downward from the recess portion 4a, and the stopper 22 can be moved toward the rod guide 4 while pushing up the shutter 6 against the urging force of the coil spring 7. Further, since the piston 2 is inhibited from being further moved to the extension side by the contact between the stopper 22 and the rod guide 4, the extension load can be received by the rod guide 4.

Further, in the present embodiment, the distance z (FIG. 4) from the fixed end (one end) 7b of the coil spring 7 to the opening end of the recess portion 4a is longer than the distance from the fixed end 7b in a state where the coil spring 7 has a close-contact length to the lower end of the shutter 6.

Therefore, when the stopper 22 and the rod guide 4 are in contact with each other, the shutter 6 is housed in the recess portion 4a and the coil spring 7 does not have a close-contact length. That is, with the above configuration, since it is possible to prevent that the coil spring 7 receives a load in a state where the coil spring 7 has a close-contact length, the durability of the coil spring 7 can be improved.

Further, in the present embodiment, the coil spring 7 is connected to the rod guide 4 via the connection member 8. The connection member 8 has the annular fitting portion 8a fitted to the inner circumference of the upper end portion (one end portion) of the coil spring 7, and the seat portion (one end-side seat portion) 8b that projects outward in the radial direction from one end of the fitting portion 8a and is in contact with the upper end (one end) of the coil spring 7. Further, the shutter 6 has the tubular shutter main body 6a that is fitted to the inner circumference of the lower end portion (the other end portion) of the coil spring 7 and is in sliding contact with the outer circumference of the piston rod 3, and the seat portion (the other end-side seat portion) 6b that projects outward in the radial direction from one end of the shutter main body 6a and is in contact with the lower end (the other end) of the coil spring 7.

Then, in the present embodiment, in a state where the stopper 22 is in contact with the rod guide 4, a gap is formed between the fitting portion 8a and the shutter main body 6a, and as described above, in a state where the stopper 22 is in contact with the rod guide 4, the coil spring 7 is set not to have a close-contact length. Therefore, a force greater than the elastic force of the coil spring 7 is not applied to the shutter 6, and the durability of the shutter 6 can be improved.

However, the configuration for inhibiting the movement of the piston 2 to the extension side is not limited to the above described configuration, and can be appropriately changed. For example, the movement of the piston 2 to the extension side may be inhibited by causing the coil spring 7 to have a close-contact length, or causing the shutter 6 to hit the connection member 8 or the rod guide 4. Further, such a change is possible regardless of the configuration of the elastic member that connects the shutter 6 and the rod guide 4.

Furthermore, in the present embodiment, the shutter 6 has the annular shutter main body 6a that is in sliding contact with the outer circumference of the piston rod 3. Therefore, it is easy to keep a state in which the opening b1 of the bypass passage B is closed by the shutter 6.

However, as long as the shutter 6 can open or close the opening b1 of the bypass passage B, the shutter 6 may not necessarily have an annular shape, and the configuration of the shutter 6 can be appropriately changed. Further, the configuration for connecting the shutter 6 and the rod guide 4 via the elastic member can be appropriately changed. Specifically, the configuration of the connection member 8 can be appropriately changed, or the connection member 8 may be omitted and the elastic member may be directly connected to the rod guide 4. Such changes are possible regardless of the configuration of the elastic member that connects the shutter 6 and the rod guide 4 and the configuration for inhibiting the movement of the piston 2 to the extension side.

Further, in the present embodiment, the annular cushion rubber 9 is mounted on the inner circumference of the recess portion 4a formed in the rod guide 4. In the initial attachment state, the lower end (tip end) of the cushion rubber 9 projects outward from the recess portion 4a, and the lower end (tip end) of the shutter 6 is located (on the stopper 22 side) below the lower end (tip end) of the cushion rubber 9.

With the above configuration, in the extension stroke of the shock absorber D, the coil spring 7 is first compressed to urge the shock absorber D in the contraction direction, and then the cushion rubber 9 is also compressed to urge the shock absorber D in the contraction direction. Therefore, the extension operation of the shock absorber D is hindered by the urging force of the coil spring 7 and the cushion rubber 9, and the force hindering the extension operation can be increased stepwise. Therefore, the shock at the time of maximum contraction of the shock absorber D can be reliably alleviated. Furthermore, the force hindering the extension operation of the shock absorber D is not suddenly increased, and in a case where the shock absorber D is interposed between the vehicle body and the wheels, the ride comfort of the vehicle can be improved.

However, the cushion rubber 9 may not necessarily be provided. Such a change is possible regardless of the configuration of the elastic member that connects the shutter 6 and the rod guide 4, the configuration for inhibiting the movement of the piston 2 to the extension side, the configuration of the shutter 6, and the configuration for connecting the shutter 6 and the rod guide 4 via the elastic member.

Although the preferred embodiments of the invention have been described above in detail, modifications, variations and changes are possible without departing from the scope of the claims.

The invention claimed is:

1. A shock absorber comprising:
   a cylinder;
   a piston that is slidably inserted into the cylinder and divides an inside of the cylinder into an extension side chamber and a compression side chamber;
   a piston rod that is inserted into the cylinder to be movable in an axial direction and is connected to the piston;
   an annular rod guide that is mounted on one end of the cylinder in the axial direction and slidably supports the piston rod;
   a passage that is open from a side of the piston rod and causes the extension side chamber and the compression side chamber to communicate with each other;
   a shutter that is mounted on an outer circumference of the piston rod to be movable in the axial direction and opens or closes the passage;
   a coil spring that connects the shutter and the rod guide; and
   a stopper that comes into contact with a tip end of the rod guide and a tip end of the shutter is provided on the outer circumference of the piston rod,
   wherein a recess portion that is open from the tip end of the rod guide and houses the shutter and the coil spring is formed in the rod guide, and
   wherein a distance from one end of the coil spring on the rod guide side to an opening end of the recess portion is shorter than a distance from the one end of the coil spring in a state where the coil spring has a natural length to the tip end of the shutter, and is longer than a distance from the one end of the coil spring in a state where the coil spring has a close-contact length to the tip end of the shutter.

2. The shock absorber according to claim 1,
   wherein the coil spring is connected to the rod guide via a connection member,
   the connection member has an annular fitting portion that is fitted to an inner circumference of one end portion of the coil spring, and one end-side seat portion that projects outward in a radial direction from one end of the fitting portion and is in contact with the one end of the coil spring,
   the shutter has a tubular shutter main body that is fitted to an inner circumference of the other end portion of the coil spring and is in sliding contact with the outer circumference of the piston rod, and the other end-side seat portion that projects outward in the radial direction from one end of the shutter main body and is in contact with the other end of the coil spring, and
   a gap is formed between the fitting portion and the shutter main body in a state where the stopper is in contact with the rod guide.

3. The shock absorber according to claim 1,
   wherein an annular cushion rubber is mounted on an inner circumference of the recess portion, and
   in an initial attachment state, a tip end of the cushion rubber projects outward from the recess portion, and the tip end of the shutter is located to be closer to the stopper than the tip end of the cushion rubber.

4. The shock absorber according to claim 1, further comprising:
   a valve body that is inserted into the passage and changes a flow passage area of the passage; and
   an adjuster that drives the valve body via a control rod inserted into the piston rod.

5. The shock absorber according to claim 2, further comprising:
   a valve body that is inserted into the passage and changes a flow passage area of the passage; and
   an adjuster that drives the valve body via a control rod inserted into the piston rod.

6. The shock absorber according to claim 3, further comprising:
   a valve body that is inserted into the passage and changes a flow passage area of the passage; and
   an adjuster that drives the valve body via a control rod inserted into the piston rod.

* * * * *